United States Patent
Kumazawa et al.

(10) Patent No.: US 7,957,383 B2
(45) Date of Patent: Jun. 7, 2011

(54) METHOD OF SHARING NETWORK IDENTIFIER AND MOBILE ROUTER

(75) Inventors: Masayuki Kumazawa, Kanagawa (JP); Taisuke Matsumoto, Kanagawa (JP)

(73) Assignee: Panasonic Corporation, Osaka (JP)

(*) Notice: Subject to any disclaimer, the term of this patent is extended or adjusted under 35 U.S.C. 154(b) by 425 days.

(21) Appl. No.: 11/815,797

(22) PCT Filed: Feb. 9, 2006

(86) PCT No.: PCT/JP2006/302226
§ 371 (c)(1),
(2), (4) Date: Aug. 8, 2007

(87) PCT Pub. No.: WO2006/085568
PCT Pub. Date: Aug. 17, 2006

(65) Prior Publication Data
US 2008/0219263 A1    Sep. 11, 2008

(30) Foreign Application Priority Data
Feb. 10, 2005    (JP) .................................. 2005-034039

(51) Int. Cl.
*H04L 12/66* (2006.01)
*H04W 4/00* (2009.01)
*G06F 15/173* (2006.01)
(52) U.S. Cl. ......... 370/392; 370/338; 370/352; 709/238
(58) Field of Classification Search .......... 370/254–328, 370/331–338, 389–401, 351; 709/225–238
See application file for complete search history.

(56) References Cited

U.S. PATENT DOCUMENTS

| 7,333,461 | B2 * | 2/2008 | Thubert et al. ................ 370/338 |
| 7,447,800 | B2 | 11/2008 | Kobayashi et al. |
| 2002/0199015 | A1 | 12/2002 | Tari et al. |
| 2004/0081152 | A1 * | 4/2004 | Thubert et al. ................ 370/392 |
| 2006/0268688 | A1 | 11/2006 | Isozu |

FOREIGN PATENT DOCUMENTS

| JP | 2003-318958 A | 11/2003 |
| JP | 2004-120322   | 4/2004 |
| JP | 2004-274733 A | 9/2004 |

(Continued)

OTHER PUBLICATIONS

IEEE Paper "Router Selection for Moving Networks", Kumazawa et al., presented at the IEEE Consumer Communications and Networking Conference, Jan. 5-8, 2004, pp. 99-104.*

(Continued)

Primary Examiner — M. Phan
(74) Attorney, Agent, or Firm — RatnerPrestia

(57) ABSTRACT

In a case where internal links connected to plural mobile routers in a mobile network respectively have unique network identifiers initially set, the mobile router, when receiving a network identifier different from the initial setting advertised from another mobile router, selects either one of the network identifier initially set to the self and that advertised, as a network identifier of the internal link connected to the self. Then, if the one selected is identical to that initially set, the mobile router advertises the network identifier to within the mobile network and registers it in a home agent. If not identical, the mobile router registers the one advertised in the home agent as a network identifier of the internal link connected to the self.

7 Claims, 16 Drawing Sheets

FOREIGN PATENT DOCUMENTS

JP        2004-282270 A    10/2004
JP        2005-034039        3/2010

OTHER PUBLICATIONS

International Search Report for Application No. PCT/JP2006/302226, dated Mar. 7, 2006.

Kumazawa, et al., "Token based Duplicate Network Detection for split mobile network," draft-kunnazawa-nemo-tbdnd-01.txt, [online], IETF NEMO Working Group, Oct. 12, 2004, [retrieved on Feb. 27, 2006], retrieved from the Internet: <URL.http://www.mobilenetworks.org/nemo/drafts/draft-kumazawa-nemo-tbdnd-01.txt>.

Kumazawa, et al., "Router selection for moving networks," Consumer Communications and Networking Conference, 2004. CCNC 2004. First IEEE, Jan. 2004, pp. 99-104, ISBN 0-7803-8145-9.

Devarapalli, et al., "Network Mobility (NEMO) Basic Support Protocol," The Internet Society (2005), Standards Track, pp. 1-33.

* cited by examiner

FIG. 7

| Address of transmission-source mobile router /81 | Network identifier /82 | Expiration time /83 |
|---|---|---|
| LL_MR4-1 | MNP2 | 3 |
| | | |

FIG. 8

| Network identifier /91 | Registered flag /92 | Selection index /93 | Registrant flag /94 | Selection flag /95 |
|---|---|---|---|---|
| MNP2 | 1 | 100 | 1 | 1 |
| | | | | |

FIG. 9A

| Network identifier (91) | Registered flag (92) | Selection index (93) | Registrant flag (94) | Selection flag (95) |
|---|---|---|---|---|
| MNP3 | 1 | 50 | 1 | 1 |
|  |  |  |  |  |

FIG. 9B

| Network identifier | Registered flag (92) | Selection index | Registrant flag | Selection flag (95) |
|---|---|---|---|---|
| MNP3 | 1 | 50 | 1 | 0 |
| MNP2 | 0 | 100 | 0 | 1 |

FIG. 9C

| Network identifier | Registered flag | Selection index | Registrant flag | Selection flag |
|---|---|---|---|---|
| MNP3 | 0 | 0 | 1 | 0 |
| MNP2 | 1 | 100 | 0 | 1 |

FIG. 10

| HoA | CoA | Lifetime |
|---|---|---|
| HoA_MR4-1 | CoA_MR4-1 | **** |
| HoA_MR4-2 | CoA_MR4-2 | **** |

| Network identifier | Mobile router |
|---|---|
| MNP2 | HoA_MR4-1 |
| MNP3 | HoA_MR4-2 |

| Network identifier | Mobile router |
|---|---|
| MNP2 | HoA_MR4-1 |
| MNP2 | HoA_MR4-2 |

| IP address | MAC address | Interface |
|---|---|---|
| 1:1:1:1:200:1ff:fe00:1 | 0:0:1:0:0:1 | IF_in |
| 1:1:1:1:200:1ff:fe00:2 | 0:0:1:0:0:2 | IF_in |

(141) (142) (143)

METHOD OF SHARING NETWORK IDENTIFIER AND MOBILE ROUTER

THIS APPLICATION IS A U.S. NATIONAL PHASE APPLICATION OF PCT INTERNATIONAL APPLICATION PCT/JP2006/302226.

TECHNICAL FIELD

The present invention relates to a method of sharing a network identifier in a mobile network system composed of a mobile network including terminals and mobile routers, and a home agent, in order for plural mobile routers in the mobile network to share one network identifier.

BACKGROUND ART

Conventionally, a technique of providing mobility of the entire network composed of a movable terminal group and routers has been examined in IETF NEMO-WG.

NEMO (Network Mobility) described in *Network Mobility Basic Support Protocol* (written by Vijay Devarapalli et al., rfc3963.txt) is a technique that implements data reachability in a network (referred to as "mobile network" hereinafter) composed of a movable terminal group and mobile routers connecting to an external network such as the Internet by means of the mobile network and a home agent that manages the position of the mobile network.

In such a mobile network system composed of a mobile network and home agent, one mobile network including plural mobile routers may connect to another network through plural nodes. Japanese Patent Unexamined Publication No. 2004-120322 discloses a technique that determines whether or not communication is performed with a mobile router from among plural mobile routers as a node and that manages the communication.

FIG. 18 illustrates the makeup of a conventional mobile network system described in the publication.

In FIG. 18, mobile network 1301 is connected to first subnetwork 1201 through first mobile router (MR) 1311. At this moment, second mobile router (MR) 1312 detects that it has entered a state connectable to second subnetwork 1202. Then, mobile router (MR) 1312 inquires of position management device 1320 in mobile network 1301 whether or not the connection to a subnetwork is switched from first mobile router 1311 to second mobile router 1312. This process allows position management device 1320 to select a mobile router to be an optimum node.

FIG. 17 is a sequence diagram illustrating a communication state in a case where plural mobile routers that have respectively formed different mobile networks exist in one mobile network. Here, a black circle in the diagram indicates a transmission source, and a black triangle indicates a relay node.

In FIG. 17, mobile routers (MR) 1311, 1312 composing mobile network 1301 used to form different mobile networks respectively. Accordingly, they have respectively unique prefixes (network identifier) MNP2, MNP3 being set (step S101).

Here, mobile routers 1311, 1312 connect to access router 1211 and acquires care of addresses CoA_MR4, CoA_MR5, respectively (step S102).

Next, mobile routers 1311, 1312 register MNP2, MNP3 in home agent (HA) 1231 (step S103).

Mobile router 1311 transmits a router advertisement message including MNP2 after completing position registration (step S104), and terminal 1310-1 create an address using MNP2 (step S105).

After that, terminal 1310-1 communicates with external terminal 1221 through mobile router 1311 and home agent 1231 (step S106).

Mobile router 1312, like mobile router 1311, transmits a router advertisement message including MNP3 (step S107).

Terminal 1310-n in mobile network 1301 creates an address using MNP3 in the router advertisement preliminarily received, and communicates (step S108).

This means that mobile network 1301 can include both terminal 1310-1 with an address created from MNP2 and terminal 1310-n with MNP3. They used to communicate with external terminal 1221 through mobile router 1311 and mobile router 1312, respectively.

However, the above-described conventional makeup can be implemented provided that first mobile router 1311 and second mobile router 1312 in FIG. 18 have prefixes with the same internal link from the first. That is, first mobile router 1311 and second mobile router 1312 can relay communication between subordinate terminals 1310-1 to 1310-n, all connected to the internal link, and external terminal 1221. However, if second mobile router 1312 joins a mobile network formed by first mobile router 1311 while another mobile network is formed by second mobile router 1312, for example, second mobile router 1312 cannot transfer a packet from external terminal 1221 to subordinate terminals 1310-1 to 1310-n.

In FIG. 17, meanwhile, when a mobile network having another mobile network with a different prefix connected becomes unable to connect to an external network, due to mobile router 1311 having moved outside the communication area (step S109), terminal 1310-1 communicating through mobile router 1311 cannot continue communication (step S110).

This is because home agent 1231 does not transmit to mobile router 1312, a packet to the address of terminal 1310-1, created from MNP2, as a result that mobile router 1312 has registered MNP3 in home agent 1231.

SUMMARY OF THE INVENTION

The method of sharing a network identifier, according to the present invention is that in order for plural mobile routers in a mobile network to share one network identifier. The method works as follows. That is, each of at least two mobile routers initially sets a network identifier unique to its own internal link connected. Then, the mobile router transmits a message advertising the network identifier initially set. After that, when the mobile router receives a message advertising a network identifier different from that initially set, selects either one of the network identifier initially set to the self and that advertised. After that, if the network identifier selected is identical to that initially set to the self, the mobile router continues advertising the network identifier in the mobile network and registers the network identifier in the home agent. Meanwhile if not identical, the mobile router stops transmitting a message advertising the network identifier initially set to the self, and registers the new network identifier selected in the home agent as a network identifier of the own internal link connected.

This process allows each mobile router to form a mobile network alone with a unique network identifier while sharing the network identifier with other mobile routers. This enables communication between terminals in the mobile network and an external network through any mobile router, thus implementing a redundant, load-distributable mobile network.

In the method of sharing a network identifier, according to the present invention, if the network identifier selected is not identical to that initially set to the self, the mobile router advertises to the internal link, a message indicating that the network identifier initially set to the self is invalid.

Herewith, a mobile router that has selected a network identifier different from that initially set to the self informs a terminal that has created an address using the network identifier not selected that the prefix is invalid, to make the terminal promptly change the address. Consequently, interruption of communication at a terminal can be suppressed to a short time.

In the method of sharing a network identifier, according to the present invention, a mobile router, if not receiving a message advertising a network identifier from all the other neighbor mobile routers in selecting a network identifier, selects the network identifier initially set to the self as a prefix of its own internal link connected.

This process allows a mobile router to uniquely specify a network identifier of the internal link.

The method of sharing a network identifier, according to the present invention further includes the following process. That is, a message advertising a network identifier includes information on the expiration time of the message; a mobile router that has received this message stores a network identifier and expiration time included in the message; and counts expiration time since receiving the message. When this expiration time elapses, the mobile router deletes information on the corresponding network identifier, and if the network identifier deleted is that registered in the home agent, newly selects as a network identifier of its own internal link connected, either one of the network identifier initially set to the self and a network identifier with its expiration time not expired from among those received, to update the entry in the home agent.

Herewith, a mobile router does not continue using a network identifier of an internal link while using information on the expired expiration time, thus preventing a packet to be transmitted to a disconnected mobile router.

In the method of sharing a network identifier, of the present invention, a message with which a mobile router advertises a network identifier to an internal link includes information on elapsed time since the network identifier is registered to the home agent. Then, a mobile router that has received the message selects a network identifier according to its elapsed time in the process of selecting a network identifier.

This process prevents communication within a mobile network stably maintained for a longer time than the others from being interrupted after a mobile router is registered in the home agent.

In the method of sharing a network identifier, of the present invention, a message with which a mobile router advertises a network identifier to an internal link includes the number of terminals subordinate to the self or information on such number. Then, the mobile router selects a network identifier according to the number of terminals or the information on such number in the process of selecting a network identifier.

This process suppresses the number of terminals communication of which is interrupted due to sharing a network identifier.

The mobile router of the present invention is a mobile router in a mobile network system composed of a mobile network with at least two mobile routers and at least one terminal interconnected, and a home agent that manages the position of the mobile network. The mobile router includes a network identifier setting unit, a network identifier advertisement receiving unit, a network identifier selecting unit, a movement management unit, and a network identifier advertisement transmitting unit. The network identifier setting unit initially sets a network identifier unique to an internal link to be connected. The network identifier advertisement receiving unit receives a network identifier advertised by another neighbor mobile router. The network identifier is selected as a network identifier of its own internal link connected, from either a network identifier initially set by the network identifier setting unit or that advertised, received by the network identifier advertisement receiving unit. The movement management unit requests registration of a network identifier selected by the network identifier selecting unit along with the own position information, from the home agent. The network identifier advertisement transmitting unit, if a network identifier selected by the network identifier selecting unit is that initially set, transmits a network identifier advertisement message including the network identifier, to the internal link.

This makeup allows a mobile router to form a mobile network alone with a unique network identifier while sharing the network identifier with other mobile routers. Consequently, the mobile router can share the process of relaying communication between a terminal in the mobile network and an external network, with another mobile router, and when the self becomes unable to connect, has another mobile router relay instead.

In the mobile router of the present invention, if a network identifier selected by the network identifier selecting unit is different from that initially set, the network identifier advertisement transmitting unit advertises to the internal link that the unique network identifier is invalid.

Herewith, a terminal that has created an address from a network identifier already advertised is informed that the address must be updated, thus reducing the time of interruption of the terminal communication.

In the mobile router of the present invention, if the network identifier advertisement receiving unit does not receive a network identifier advertisement message from all the other neighbor mobile routers for a given time, the network identifier selecting unit selects the network identifier initially set as that of the own internal link connected.

This process allows a mobile router to uniquely specify a network identifier of the internal link.

A network identifier advertisement message transmitted by the mobile router of the present invention includes information on elapsed time since the network identifier is registered to the home agent. Then, the network identifier selecting unit selects a network identifier of the internal link according to information on the elapsed time.

This process prevents communication of a terminal in a mobile network stably maintained for a longer time than the others from being interrupted after a mobile router is registered in the home agent.

A network identifier advertisement message transmitted by a mobile router of the present invention includes the number of terminals subordinate to the mobile router as a transmission source or information on such number. Then, the network identifier selecting unit selects a network identifier according to the number of terminals or the information on such number.

This process suppresses the number of terminals communication of which is interrupted due to sharing a network identifier.

As described above, according to the present invention, one network identifier can be shared among plural mobile routers in the same internal link, with different network identifiers having been set at first. Consequently, robustness and load distribution are implemented by means of plural mobile routers.

BRIEF DESCRIPTION OF DRAWINGS

FIG. 7 shows the structure of data in the advertisement information storing unit of a mobile router according to the embodiment of the present invention.

FIG. 8 shows the structure of data in the network identifier storing unit of a mobile router according to the embodiment of the present invention.

FIG. 9A shows an example of details of data in the network identifier storing unit of a mobile router according to the embodiment of the present invention.

FIG. 9B shows an example of details of data in the network identifier storing unit of a mobile router according to the embodiment of the present invention.

FIG. 9C shows an example of details of data in the network identifier storing unit of a mobile router according to the embodiment of the present invention.

FIG. 10 shows an example of details of data in the position information storing unit of a home agent according to the embodiment of the present invention.

FIG. 11A shows an example of details of data in the network identifier storing unit of a home agent according to the embodiment of the present invention.

FIG. 11B shows an example of details of data in the network identifier storing unit of a home agent according to the embodiment of the present invention.

FIG. 13 shows details of data in a neighbor cache of a mobile router according to the embodiment of the present invention.

REFERENCE MARKS IN THE DRAWINGS

Figure 1:
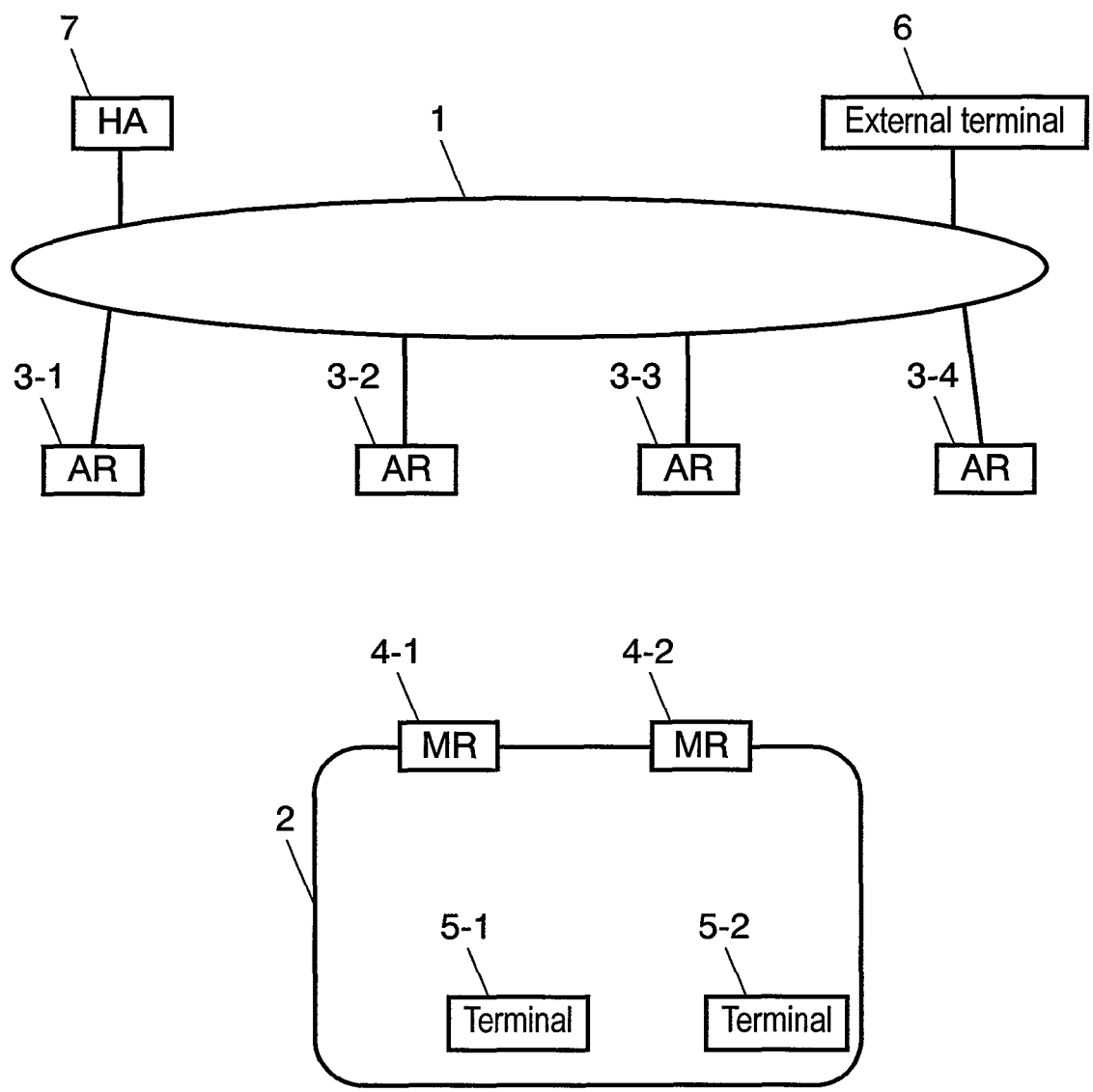
FIG. 1 illustrates the makeup of a mobile network system according to the embodiment of the present invention.

1 External network
2 Mobile network
3 Access router
4 Mobile router
5, 6 Terminal
7 Home agent
401 Internal network interface
402 Packet sending and receiving/relay processing unit
403 External network interface
404 Movement management unit
405 Network identifier advertisement transmitting unit
406 Network identifier advertisement receiving unit
407 Network identifier selecting unit
408 Position information storing unit
409 Network identifier storing unit
410 Advertisement information storing unit
411 Network identifier setting unit
701 Home network interface
702 Packet sending and receiving/relay processing unit
703 Movement management unit
704 Position information storing unit
705 Network identifier storing unit
1201, 1202 Subnetwork
1211 Access router
1221 External terminal
1231 Home agent
1301 Mobile network
1310 Terminal
1311, 1312 Mobile router
1320 Position management device

DETAILED DESCRIPTION OF PREFERRED EMBODIMENT

Hereinafter, a description is made for the embodiment of the present invention with reference to the related drawings.

EXEMPLARY EMBODIMENT

FIG. 1 illustrates the makeup of a mobile network system according to the exemplary embodiment of the present invention.

In FIG. 1, mobile routers (MR) 4-1, 4-2, and terminals 5-1, 5-2 compose mobile network 2. External network (e.g. the Internet) 1 connects to home agent 7 that manages the position of a mobile network, access routers (AR) 3-1 through 3-4 that connect to a mobile network, and external terminal 6.

This embodiment includes two mobile routers, but not limited. Access routers 3-1 through 3-4 have a wireless (e.g. cellular, wireless LAN) or wired interface connectable with a mobile router. An internal link connected to a mobile router may be either wired or wireless.

Next, a description is made for the makeup of a mobile router according to the present invention using the related drawings.

Figure 2:
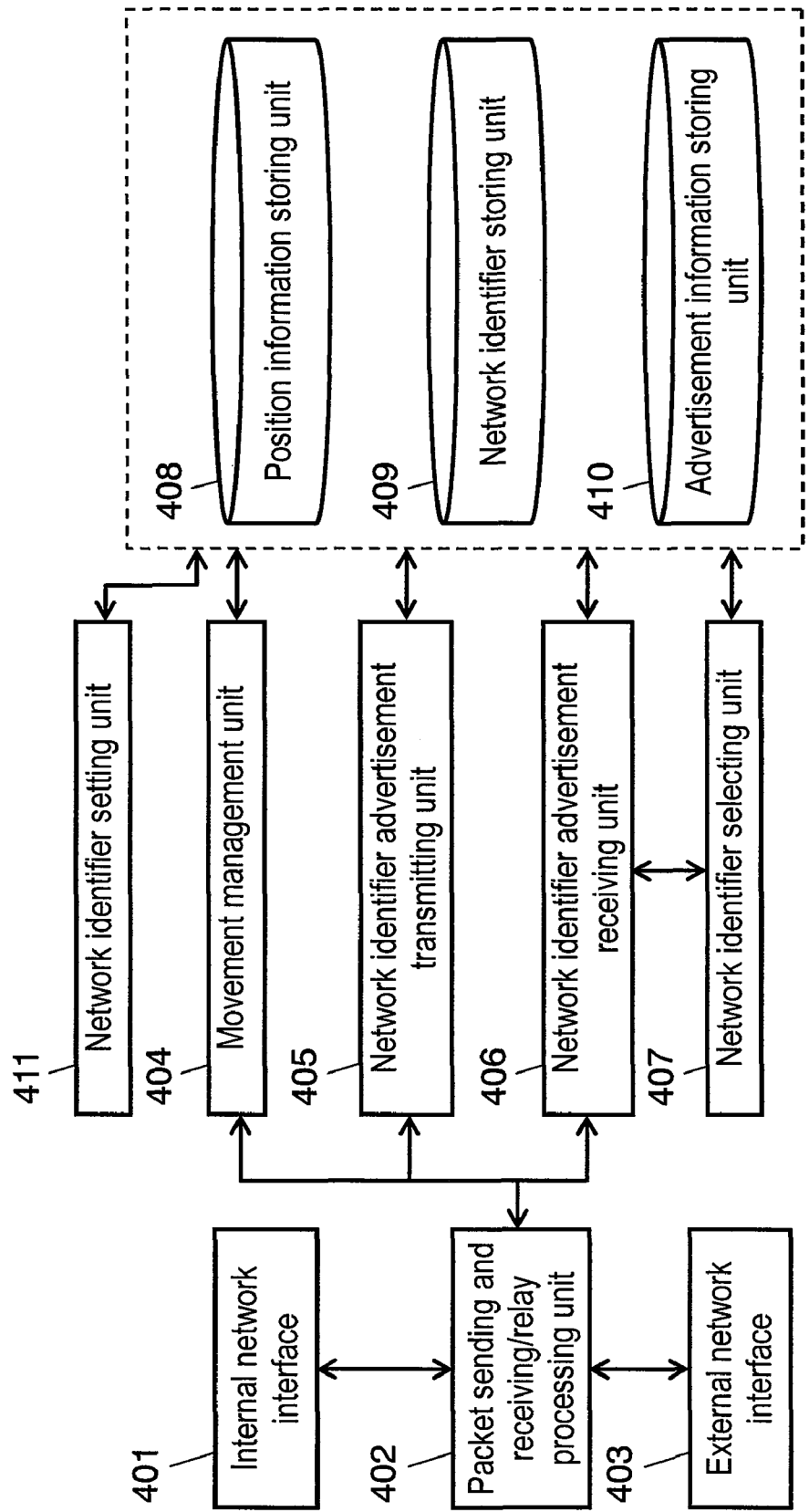
FIG. 2 illustrates the makeup of a mobile router according to the embodiment of the present invention.

FIG. 2 illustrates the makeup of mobile router 4 according to the embodiment.

In FIG. 2, internal network interface 401 performs a physical layer process and a data link layer process in the communication with a terminal and another mobile router connected to mobile network 2. External network interface 403 performs a physical layer process and a data link layer process for connecting to nodes to external network 1, such as an access router, base station, and access point. Packet sending and receiving/relay processing unit 402 relays and receives a packet received from internal network interface 401 and external network interface 403. Unit 402 performs processes for IP and its upper layers (TCP, UDP, ICMP) when transmitting a packet from the mobile router itself.

Network identifier setting unit 411, having a user interface, sets a prefix for a link connecting to internal network interface 401 according to user's directions.

Movement management unit 404 registers a mobile router in home agent 7. Position information storing unit 408 stores position information managed by movement management unit 404.

Network identifier advertisement transmitting unit 405 transmits a network identifier advertisement message (referred to as "RA message" hereinafter). Network identifier advertisement receiving unit 406 receives an RA message transmitted from another neighbor mobile router.

In this embodiment, an RA message employs a Router Advertisement message defined in RFC2461. The RA message features defining the network identifier selection index field (described later) as the prefix option of a router advertisement message.

Figure 12:
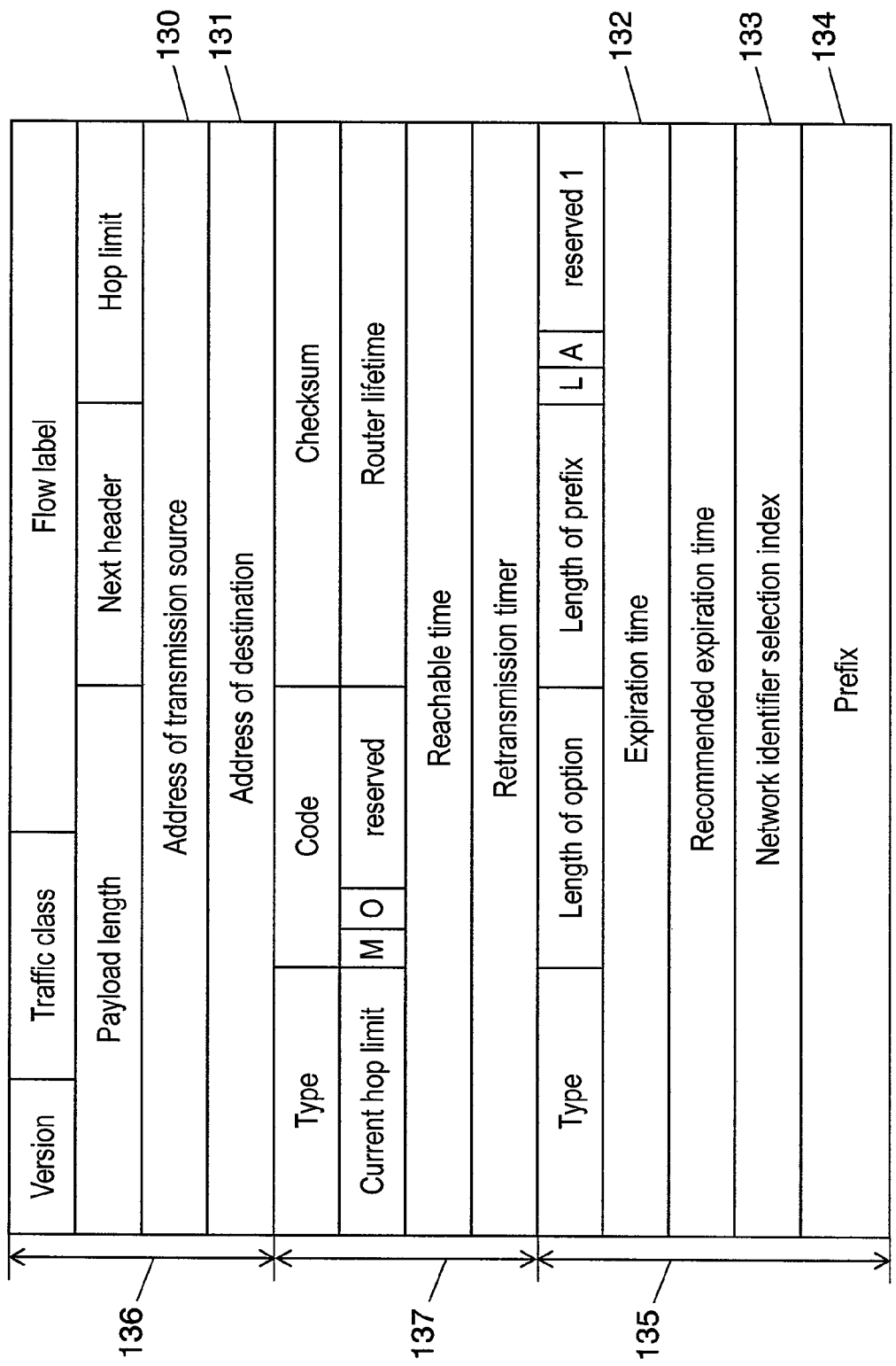
FIG. 12 shows the format of an RA message according to the embodiment of the present invention.

FIG. 12 illustrates the format of an RA message according to the present invention.

In FIG. 12, transmission source address 130 and destination address 131 include the link local address of a mobile router as a transmission source and a multicast address addressed to all the nodes in the link, respectively.

Expiration time field 132 in prefix option 135 includes expiration time of an address created from prefix 134, and prefix field 134 includes a network identifier. Network identifier selection index field 133 includes an index for selecting a network identifier to be shared in the mobile network from among plural network identifiers. In this embodiment, the network identifier selection index employs elapsed time (referred to as "registration time" hereinafter) since a network identifier is registered to the home agent.

This completes the description of an RA message.

Next, when receiving prefix 134, which is network identifier information, from an RA message, network identifier advertisement receiving unit 406 registers prefix 134 received in network identifier storing unit 409. Unit 406, if not having received an RA message for a given time, deletes the corresponding entry stored in network identifier storing unit 409.

Network identifier selecting unit 407 selects a network identifier to be registered in home agent 7 as a prefix of an internal link from among those recorded in network identifier storing unit 409.

Here, a description is made for the structure of data in network identifier storing unit 409 using FIG. 8.

In FIG. 8, registration is made of network identifier 91, registered flag 92, selection index 93, registrant flag 94, and selection flag 95, in a set. Network identifier field 91 records a unique network identifier (prefix) that a user has set from network identifier setting unit 411, or a network identifier informed by another mobile router using an RA message.

Registered flag 92 records '2' (Yes) if corresponding network identifier 91 is position-registered in home agent 7; otherwise, '0' (No). Here, network identifier 91 registered in home agent 7 is overwritten each time of position registration, and thus its number is limited to one.

Selection index 93 records elapsed time since the position is registered in home agent 7 if corresponding network identifier 91 is a unique network identifier registered by the self; index 93 records registration time included in an RA message if identifier 91 is the network identifier of another mobile router. In this embodiment, the value of this selection index 93 is incremented by 1 as time elapses by a timer (not shown).

Registrant flag 94 records '1' (Yes) if corresponding network identifier 91 is that registered by the self; '0' (No), if informed by another mobile router.

Selection flag 95 records '1' if network identifier 91 corresponds to a network identifier selected by network identifier selecting unit 407; otherwise, '0'.

This completes the description for the structure of data in network identifier storing unit 409.

Advertisement information storing unit 410 stores information for network identifier advertisement receiving unit 406 to manage information on arrival of an RA message.

FIG. 7 illustrates the structure of data in advertisement information storing unit 410.

In FIG. 7, recording is performed of transmission source mobile router address 81, network identifier 82, and expiration time 83, as a set. Mobile router address 81 records the address of a mobile router as a transmission source of an RA message. This address is a link local address in IPv6.

Network identifier 82 records a prefix (network identifier) set in prefix 134 of an RA message.

Expiration time 83 records elapsed time since receiving the latest RA message. This expiration time 83 is decremented by 1 as time elapses by a timer (not shown).

This completes the description of the structure of data in advertisement information storing unit 410.

A description is made for the operation and working of a mobile router with such makeup.

Figure 4:
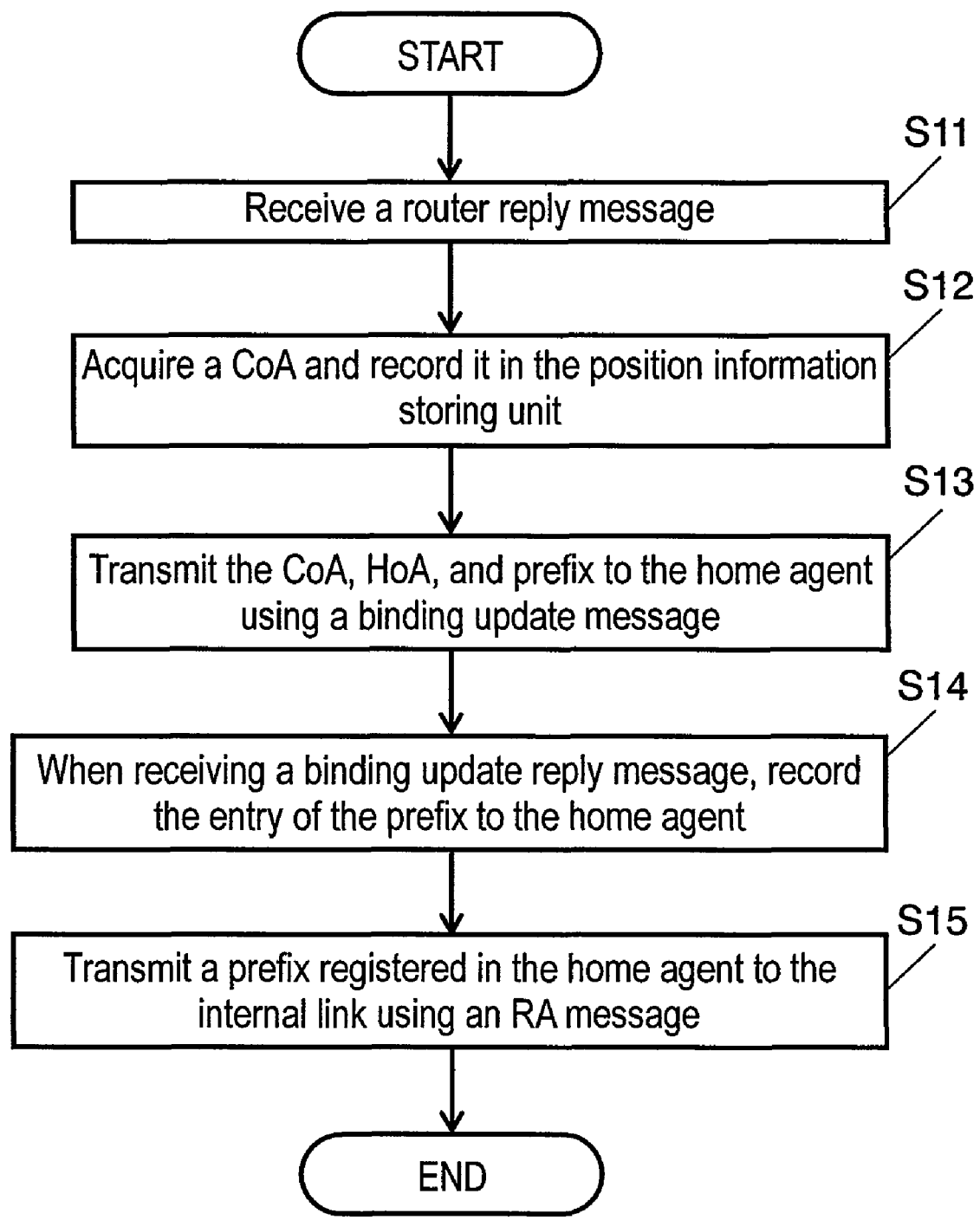
FIG. 4 is a flowchart illustrating a method of sharing a network identifier, according to the embodiment of the present invention.

FIG. 4 is a flowchart illustrating the operation when a mobile network formed by mobile router 4 connects to access router 3 in external network 1 for the first time. In this embodiment, assumption is made that a network prefix has already been set to the mobile router by network identifier setting unit 411.

First, packet sending and receiving/relay processing unit 402 receives a router advertisement message from access router 3 through external network interface 403 (step S11).

Next, unit 402 acquires a care-of address (referred to as "CoA" hereinafter) using a network prefix advertised, and informs movement management unit 404 of the CoA (step S12). Responding to this notice, unit 404 records the CoA newly acquired in position information storing unit 408, and requests packet sending and receiving/relay processing unit 402 to register in home agent 7, a home address (HoA) already allocated, and a prefix (MNP) and CoA already set as a network identifier of the internal link.

Next, responding to these requests, packet sending and receiving/relay processing unit 402 generates a position registration (Binding Update (BU)) message with a CoA newly acquired, HoA, and prefix (MNP), being set, and transmits the message to home agent 7 through external network interface 403 (step S13).

Next, when receiving a position registration acknowledgement (Binding Acknowledgement) message from home agent 7, packet sending and receiving/relay processing unit 402 informs movement management unit 404 of the message. Responding to this notice, unit 404 judges that registration in home agent 7 has been completed and records the fact that the prefix of the internal link has been registered in home agent 7, in network identifier storing unit 409 (step S14). More specifically, movement management unit 404 records a prefix set to the self, to network identifier 91 in network identifier storing unit 409, and sets '1' to registered flag 92; '0', to the selection index; and '1', to registrant flag 94. At this moment, '1' is not set to selection flag 95.

Next, network identifier advertisement transmitting unit 405 advertise an RA message including a network identifier that the self has registered in home agent 7 as a prefix option, to within mobile network 2 through internal network interface 401 (step S15).

As described above, when connecting to an access router, mobile router 4 registers information on its own position and a prefix (network identifying information) retained in home agent 7.

Next, a description is made for the operation and working when a mobile router receives the above-described RA message from another mobile router in the internal link.

Figure 5:
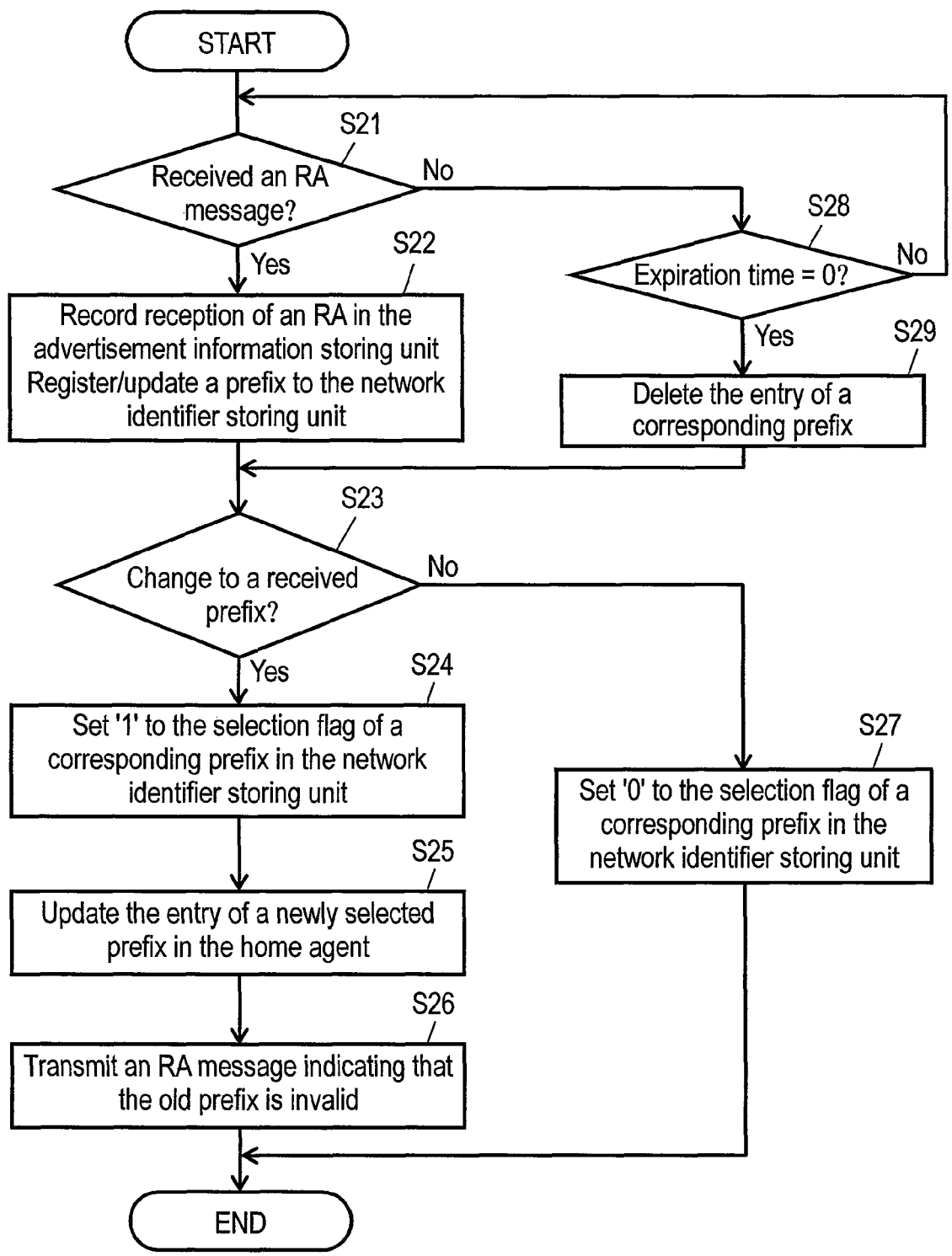
FIG. 5 is a flowchart illustrating a process of registering a network identifier of a mobile router according to the embodiment of the present invention.

FIG. 5 is a flowchart illustrating the process of registering a network identifier, in a mobile router.

First, if receiving an RA message from another mobile router through internal network interface 401 (step S21), packet sending and receiving/relay processing unit 402 informs network identifier advertisement receiving unit 406 of transmission source address 130, expiration time 132, network identifier selection index 133, and prefix 134, described in the RA message.

Responding to this notice, network identifier advertisement receiving unit 406, records transmission source address 130 as transmission-source mobile router address 81; prefix 134, as network identifier 82; and expiration time 132, as expiration time 83, in advertisement information storing unit 410, respectively. Simultaneously, network identifier advertisement receiving unit 406 newly registers prefix 134 informed to network identifier storing unit 409 additionally. More specifically, unit 406 records prefix 134 as network identifier 91; network identifier selection index 133, as selection index 93, and sets '0' to registrant flag 94. Then, unit 406 informs network identifier selecting unit 407 of a new network prefix having been registered (step S22).

Next, network identifier selecting unit 407 reads information in network identifier storing unit 409 to compare corresponding selection index 93 of the network identifier newly added, with selection index 93 corresponding to a network identifier with registered flag 92 being set (step S23). Then, if the selection index newly registered is larger than selection index 93 with registered flag 92 being set, unit 407 sets '1' to registered flag 92 corresponding to where network identifier 91 has been newly registered, as well as to selection flag 95. Further, unit 407 updates register flag 92 corresponding to a network identifier with registered flag 92 being set, to '0', as well as selection flag 95 to '0' (step S24).

Next, responding to the change of selection flag 95 recorded in network identifier storing unit 409, movement management unit 404 directs packet sending and receiving/relay processing unit 402 to update and to register a prefix of network identifier 91 with selection flag 95 newly set, in home agent 7. Responding to this direction, packet sending and receiving/relay processing unit 402 generates a Binding Update message including a new prefix of the mobile network, and transmits the message to home agent 7 through external network interface 403 (step S25).

Next, network identifier advertisement transmitting unit 405, in order to inform that a prefix advertised by the self before is invalid, generates an RA message with '0' described in network identifier selection index 133 of prefix option 135. Then, unit 405 directs to transmit the RA message to packet sending and receiving/relay processing unit 402. Responding to this direction, unit 402 appends IPv6 header 136 and router advertisement 137 to prefix option 135, and multicasts prefix option 135 through internal network interface 401 (step S26).

In step S23, meanwhile, if the selection index newly registered is smaller than selection index 93 corresponding to where registered flag 92 is set, '0' is set to registered flag 92 corresponding to where network identifier 91 is newly registered, as well as selection flag 95 to '0' (step S27), and then ends the process.

In step S21, if an RA message has not been received, network identifier advertisement receiving unit 406 checks whether or not effective information 83 recorded in advertisement information storing unit 410 is '0' (step S28).

If the expiration time is not '0', the process flow returns to step S21, and if '0', network identifier advertisement receiving unit 406 deletes an entry with its corresponding prefix registered, from network identifier storing unit 409 (step S29). After that, the process flow moves to step S23 and checks whether or not the entry of the prefix of the internal link to the home agent needs to be updated. The process after that is as described above.

A mobile router preferentially selects a prefix with longer elapsed time since registering in home agent 7, when receiving an RA message from another mobile router connected to the internal link as described above. This process prevents the communication of a terminal in the mobile network, stably maintained for a longer time than other communication, from being interrupted, after registered in home agent 7.

Next, a description is made for the operation and working in which a mobile router periodically transmits an RA message to the internal link.

Figure 6:
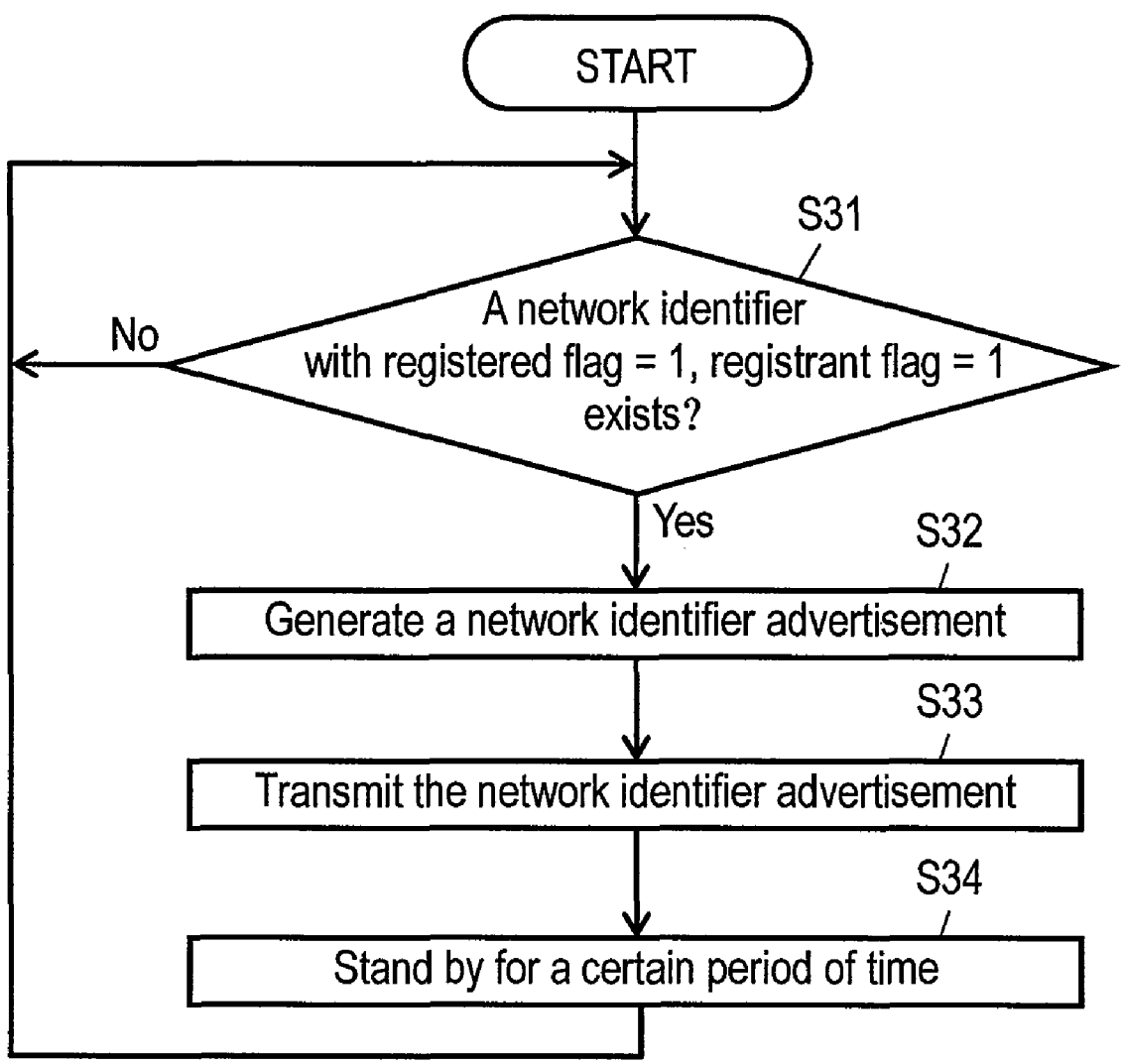
FIG. 6 is a flowchart illustrating the process of transmitting network identifier advertisement, of a mobile router according to the embodiment of the present invention.

FIG. 6 is a flowchart illustrating the network identifier advertisement transmission process by a mobile router.

Network identifier advertisement transmitting unit 405 judges whether or not a network identifier has been registered that has both registered flag 92 and registrant flag 94 recorded in network identifier storing unit 409 being set to '1' (Yes) (step S31). If such an entry exists, unit 405 sets the corresponding network identifier to prefix 134, and sets corresponding selection index 93 to network identifier selection index 133. Unit 405 generates an RA message with given initial time set to expiration time 132 (step S32). Then, unit 405 directs packet sending and receiving/relay processing unit 402 to transmit the RA message.

Responding to this direction, packet sending and receiving/relay processing unit 402 appends IPv6 header 136 and router advertisement 137 to the RA message, and multicasts the RA message to the internal link through internal network interface 401 (step S33). After that, when a certain period of time elapses (step S34), the process flow returns to step S31 to repeat the above-described process.

Next, a description is made for the makeup and operation of home agent 7 according to the embodiment.

Figure 3:
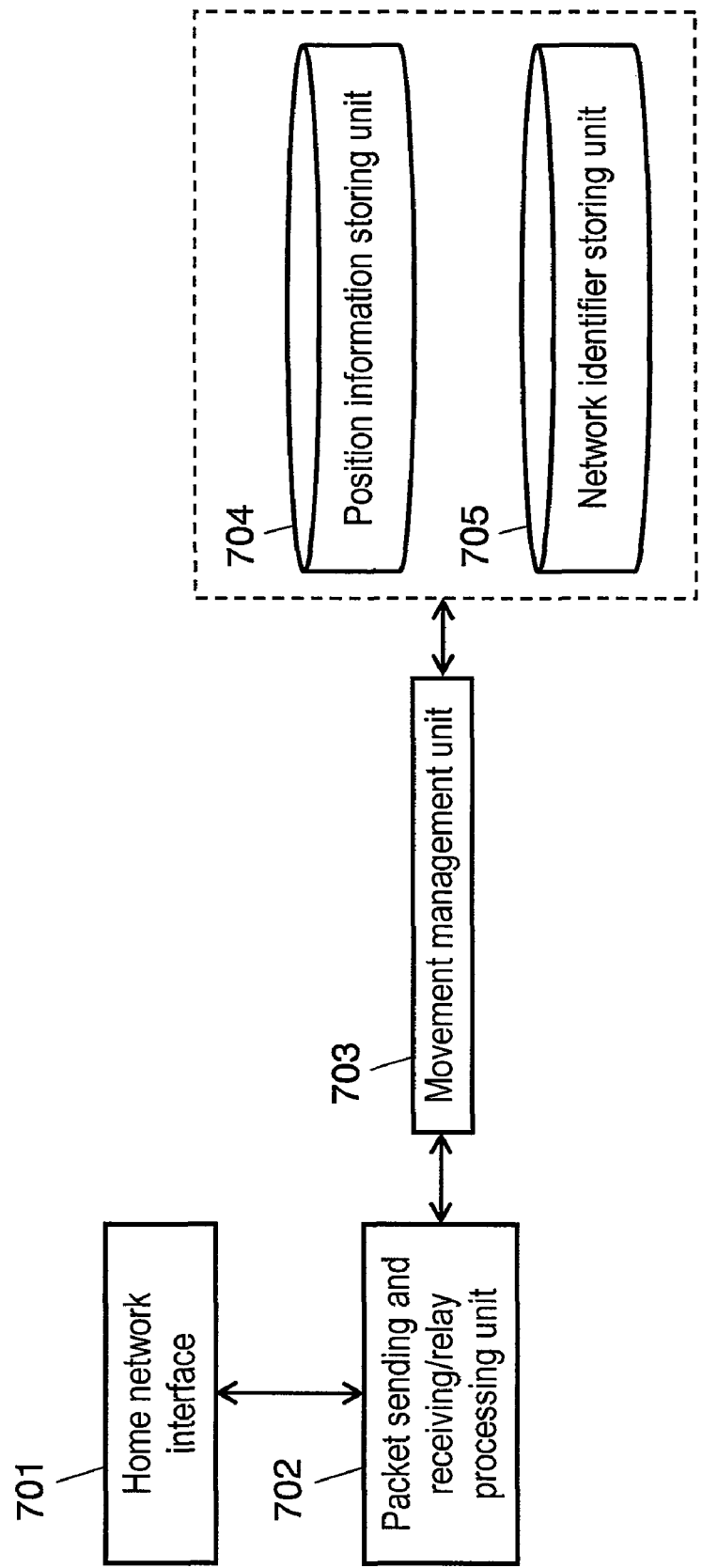
FIG. 3 illustrates the makeup of a home agent according to the embodiment of the present invention.

FIG. 3 illustrates the makeup of home agent 7.

Home network interface 701 performs a physical layer process and a data link layer process while connecting to a home network. Packet sending and receiving/relay processing unit 702 sends/receives packets and relays packets to a mobile network. Movement management unit 703 manages the position of a mobile router in a mobile network.

Position information storing unit 704 saves position information managed by movement management unit 703. The structure of data in position information recorded is shown in FIG. 10. In FIG. 10, HoA 111, CoA 112, and lifetime 113 are recorded in a set. HoA 111 and CoA 112 record the HoA (Home Address) and the CoA (Care of Address), of a mobile router that has completed its position registration process. Lifetime 113 records expiration time of the position registration information. Here, lifetime 113 is decremented as time elapses by a timer (not shown), and time movement management unit 703 deletes the entry when lifetime 113 becomes '0'.

Network identifier storing unit 705 records data in order to manage a network identifier of a mobile network. The structure of data recorded is shown in FIGS. 11A, 11B.

In FIG. 11A, network identifier 121 and mobile router 122 are recorded in a set. Network identifier 121 and mobile router 122 record a network identifier included in a Binding Update message received from a mobile router and the HoA of a mobile router as a transmission source, respectively.

Hereinafter, a description is made for the operation of home agent 7 with the above-described makeup.

Figure 15:
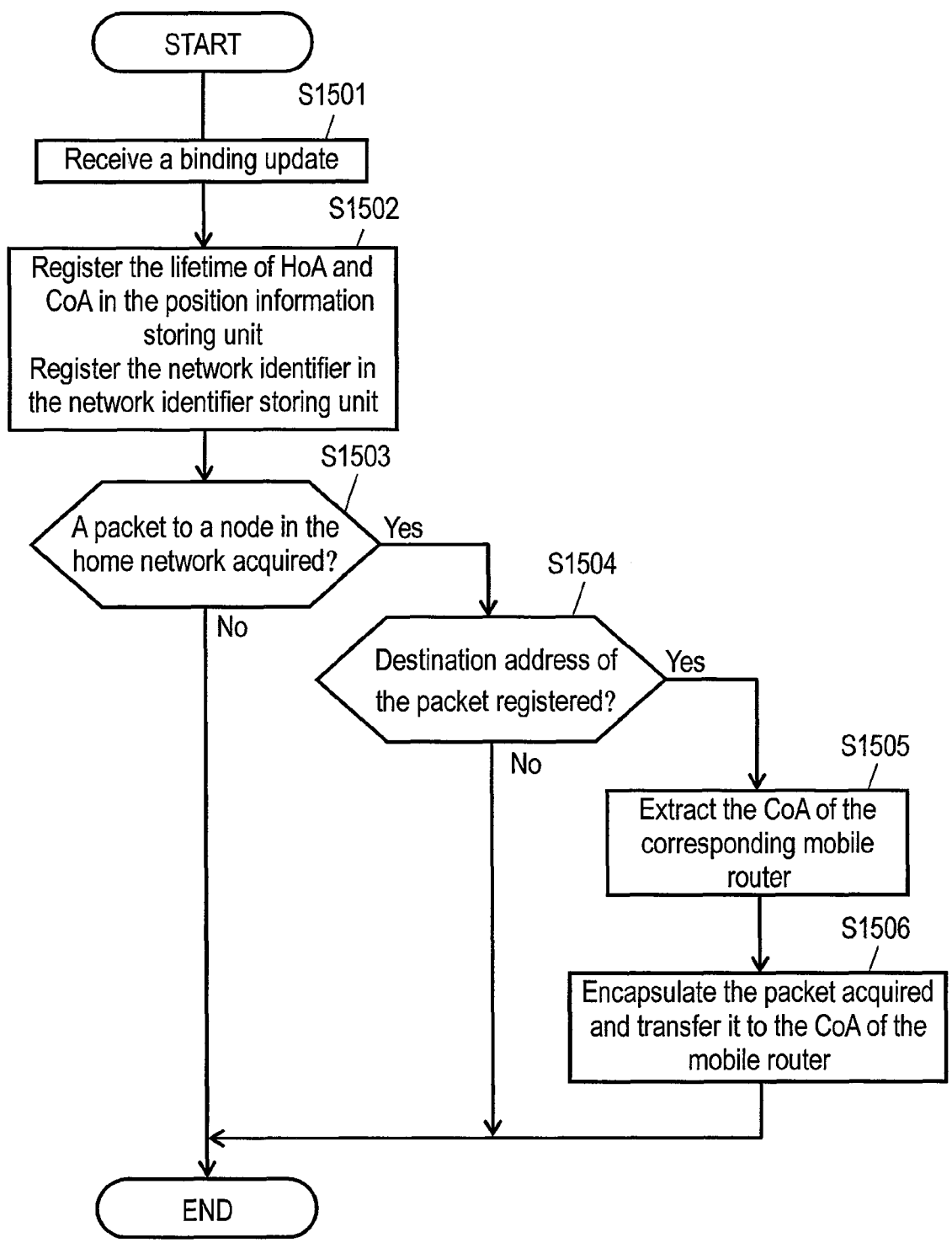
FIG. 15 is a flowchart illustrating the operation in which a home agent according to the embodiment of the present invention transfers a packet to a mobile router.

FIG. 15 is a flowchart illustrating the operation in which home agent 7 registers position registration information of a mobile router and transfers a packet to the mobile router.

First, when receiving a Binding Update message through home network interface 701, packet sending and receiving/relay processing unit 702 informs movement management unit 703 of the message (step S1501). Movement management unit 703 extracts an HoA, CoA, and lifetime from this Binding Update message to register in position information storing unit 704, and further extracts a network identifier to register it in network identifier storing unit 705 (step S1502).

After that, when acquiring a packet delivered to a node in the home network (step S1503), packet sending and receiving/relay processing unit 702 inquires of movement management unit 703 whether or not a mobile router is registered including in its network identifier, the destination address of the packet acquired (step S1504). Movement management unit 703 searches network identifier storing unit 705 for the HoA of the mobile router, on the basis of the network identifier. If a corresponding mobile router has been registered, unit 703 searches for the CoA recorded in position information storing unit 704 on the basis of the HoA (step S1505).

Then, movement management unit 703 responds to packet sending and receiving/relay processing unit 702 with the CoA acquired. Responding to this response, packet sending and receiving/relay processing unit 702 encapsulates the packet received to transfer to a mobile router with the CoA being its address (step S1506).

Here, if a same network identifier has been registered to plural mobile routers, movement management unit 703 selects one of them to respond to packet sending and receiving/relay processing unit 702.

Next, a description is made using the related drawings, for a process of sharing a network identifier, in a mobile network system including mobile routers and a home agent according to the embodiment, when plural mobile routers are connected to the same link in the mobile network, as shown in FIG. 1.

Figure 14:
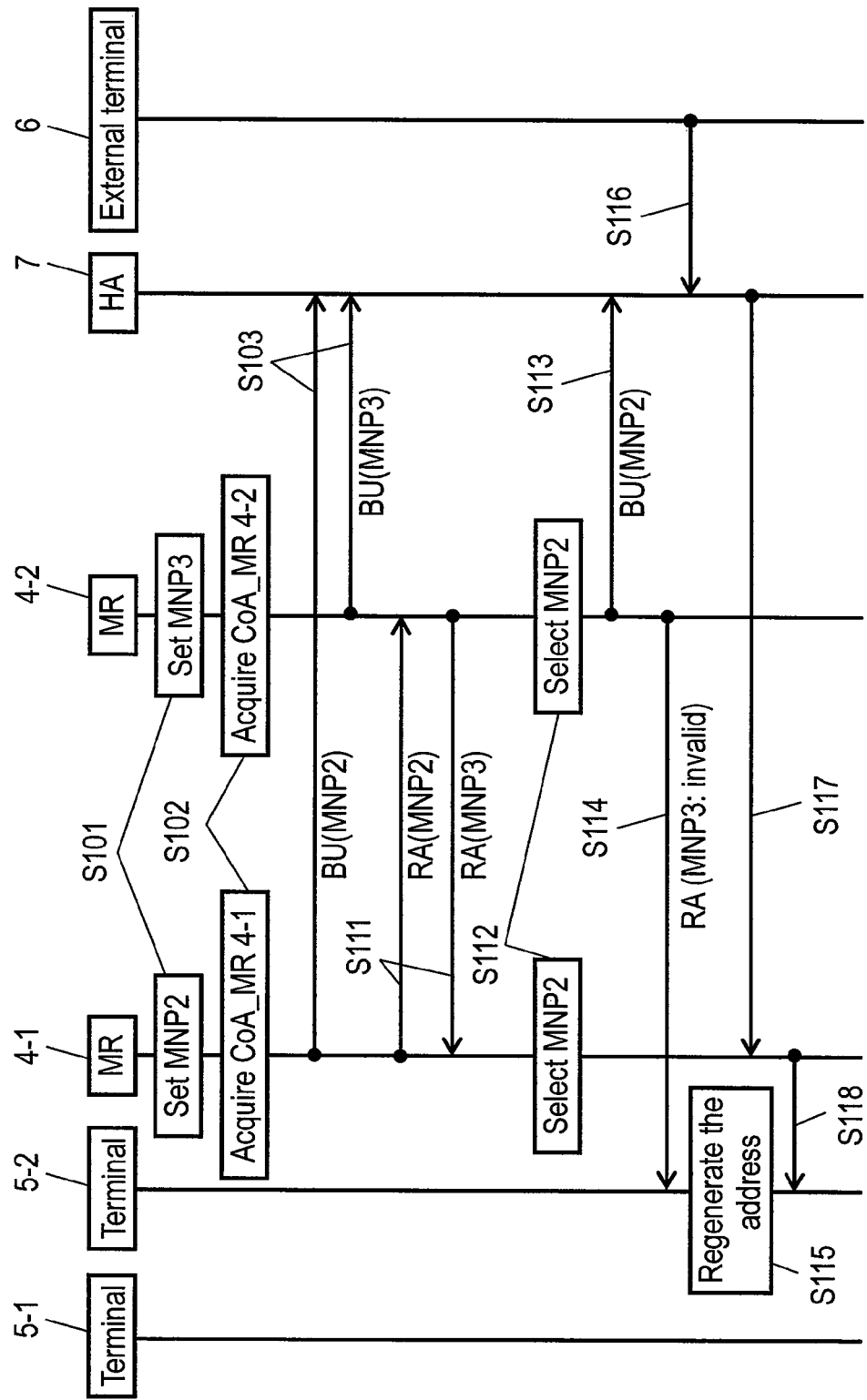
FIG. 14 is a sequence diagram illustrating a method of sharing a network identifier, according to the embodiment of the present invention.

FIG. 14 is a sequence diagram illustrating the method of sharing a network identifier, of the present invention.

First, mobile routers (MR) 4-1, 4-2 set MNP2 and MNP3 as a prefix, namely a network identifier, respectively, by a conventional method (step S101).

Next, mobile routers (MR) 4-1, 4-2, when respectively connecting to access router 3 as a result that mobile network 2 moves, acquire care-of addresses CoA_MR 4-1 and CoA_MR 4-2, respectively (step S102).

Figure 17:
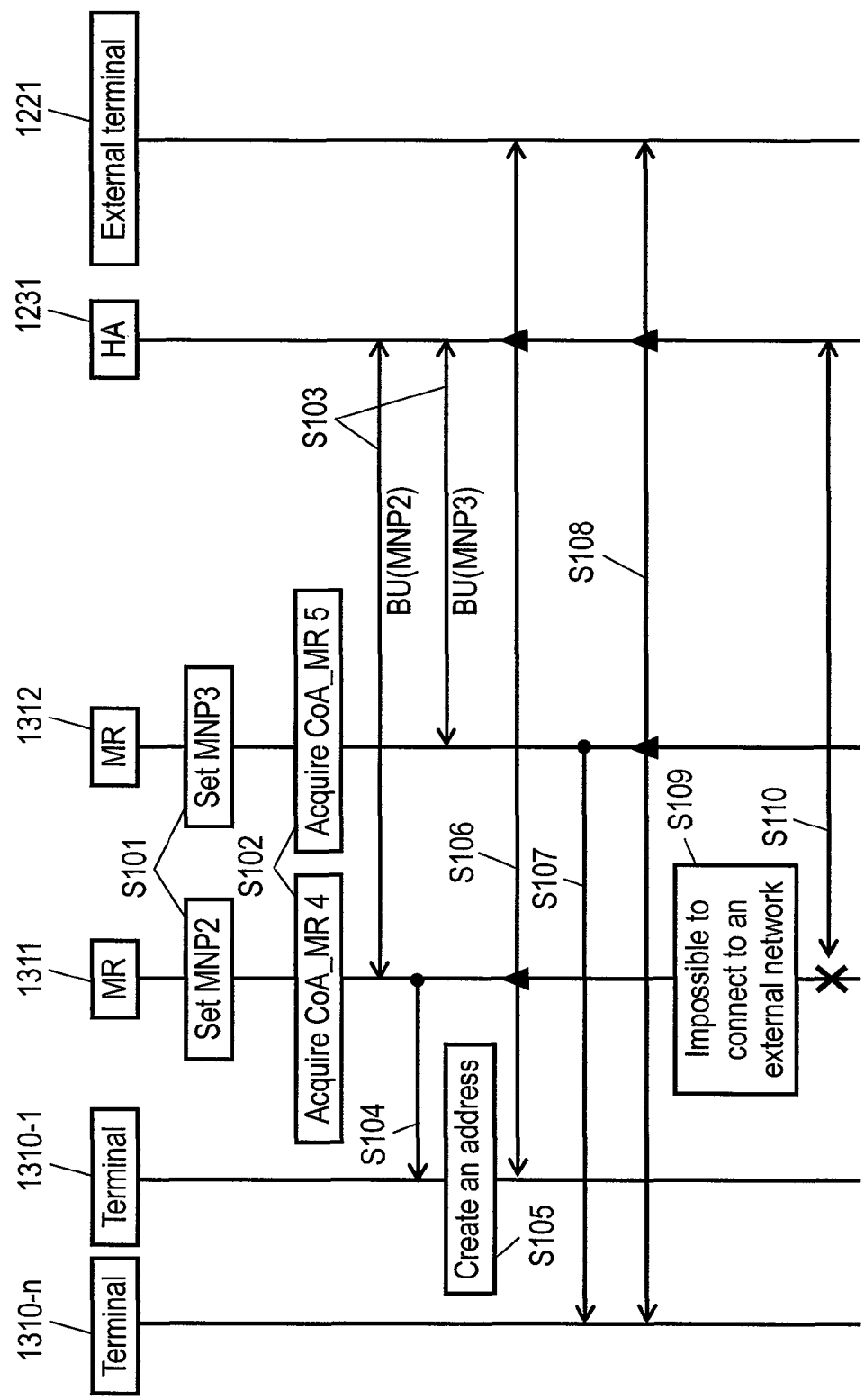
FIG. 17 is a sequence diagram illustrating a process of position registration performed by a conventional mobile router.
Figure 18:
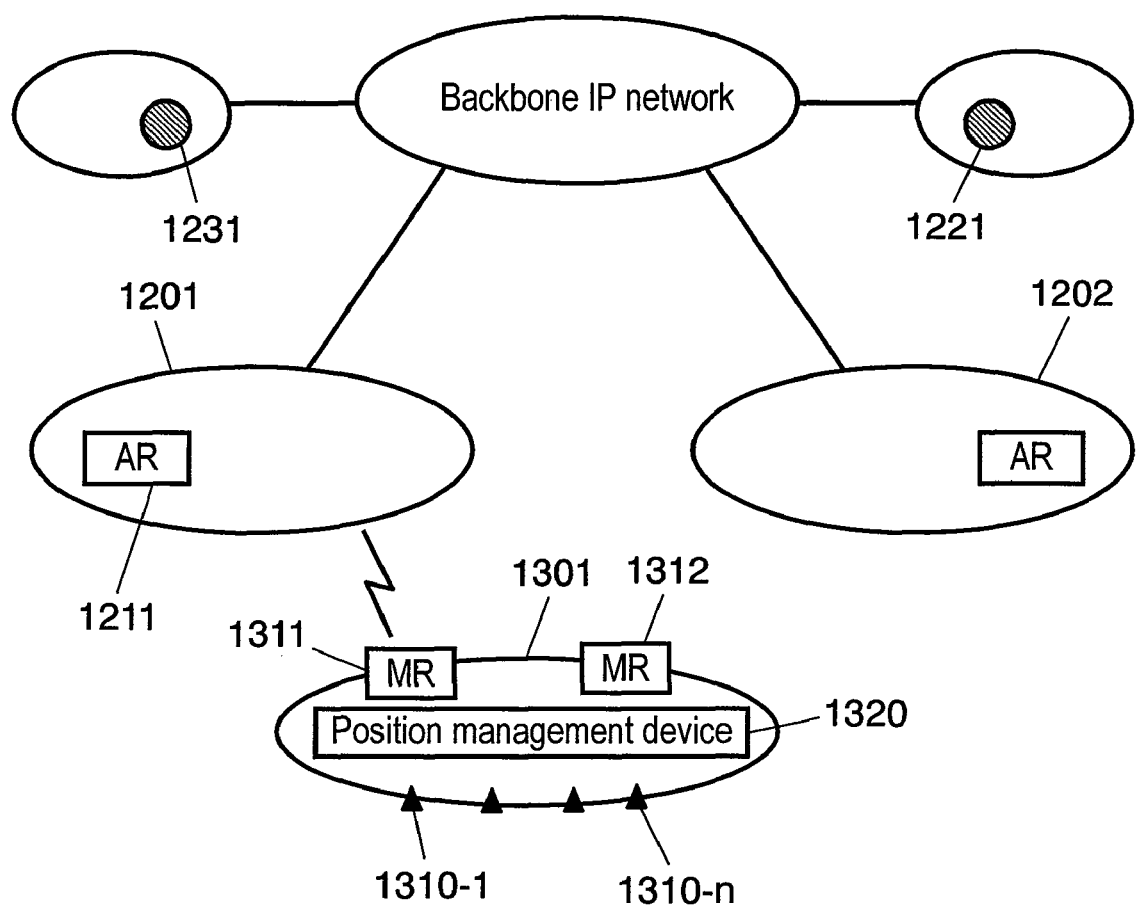
FIG. 18 illustrates the makeup of a conventional mobile network system.

Next, mobile routers (MR) 4-1, 4-2 register MNP2 and MNP3 respectively in home agent 7 (step S103). FIGS. 10, 11A show details of data in position information storing unit 704 and network identifier storing unit 705 at this moment. Herewith, in the same way as in the conventional example shown in FIG. 17, a packet addressed to terminal 5-2 with its address created from MNP3 is transferred to mobile router 4-2 according to information registered in network identifier storing unit 705, and a packet addressed to terminal 5-1 with its address created from MNP2 is transferred to mobile router 4-1.

Next, mobile routers 4-1, 4-2 advertises to within mobile network 2, an RA message including network identifiers MNP2, MNP3 that the self has registered in home agent 7, as a prefix option (step S111). Details of data in network identifier storing unit 409 of mobile routers 4-1, 4-2 at this moment are shown in FIGS. 8, 9A, respectively.

The example shows different times when mobile routers 4-1, 4-2 registered a prefix in home agent 7, and thus the registration time recorded in selection index 93 is '100' in FIG. 8 and '50' in FIG. 9A.

Next, mobile routers 4-1, 4-2, when receiving an RA message of each other, compare network identifier selection index 133, with selection index 93 included in own network identifier storing unit 409, to determine a prefix (network identifier) to be shared (step S112). In the example of FIG. 14, mobile router 4-2 that has received an RA message of mobile router 4-1 selects MNP2 because selection index 93 is larger than network identifier selection index 133 of mobile router 4-1.

Details of data in network identifier storing unit 409 of mobile router 4-2 at this moment are shown in FIG. 9B.

In FIG. 9B, although selection flag 95 of MNP2 is set to '1', what is registered in home agent 7 at this moment is MNP3, and thus registered flag 92 is set to '1' (Yes) for MNP3, and '0' (No) for MNP2.

At this moment, mobile router (MR) 4-2, which has resulted in sharing a prefix different from that registered in the home agent by the self, transmits a Binding Update message including MNP2 to home agent 7 (step S113). Responding to this massage, the home agent updates the entry of position registration. At this moment, mobile router 4-2 changes registered flag 92 of own network identifier storing unit 409 to '1' as shown in FIG. 9C.

Details of data in network identifier storing unit 705 of home agent 7 are shown in FIG. 11B. In FIG. 11B, network identifiers 121 of both mobile routers registered have MNP2 as a prefix.

Mobile router 4-2 transmits an RA message indicating that MNP3 included in another RA message already transmitted is invalid, in other words, with expiration time 132 set to '0' (step S114). Mobile router 4-2 also informs that MNP2 is a new prefix, using an RA message. Responding to the notice, terminal 5-2 re-creates an address using MNP2 (step S115).

Next, when receiving a packet addressed to terminal 5-2 in mobile network 2 (step S116), agent 7 encapsulates the packet and then selects either one of mobile routers (MR) 4-1, 4-2, since both of them registered MNP2 as a prefix, to transfer the packet to the one selected (step S117). Mobile router (MR) 4-1 that has received the packet decapsulates it and then transfers it to destination terminal 5-2 (step S118).

Mobile router 4-2, if ceasing to receive an RA message periodically transmitted from mobile router 4-1 for a certain period of time, recognizes as being breakaway from mobile network 2, and transmits a Binding Update message including MNP3 to home agent 7. Responding to the message, home agent 7 updates the entry of position registration of mobile router 4-2.

Figure 16:
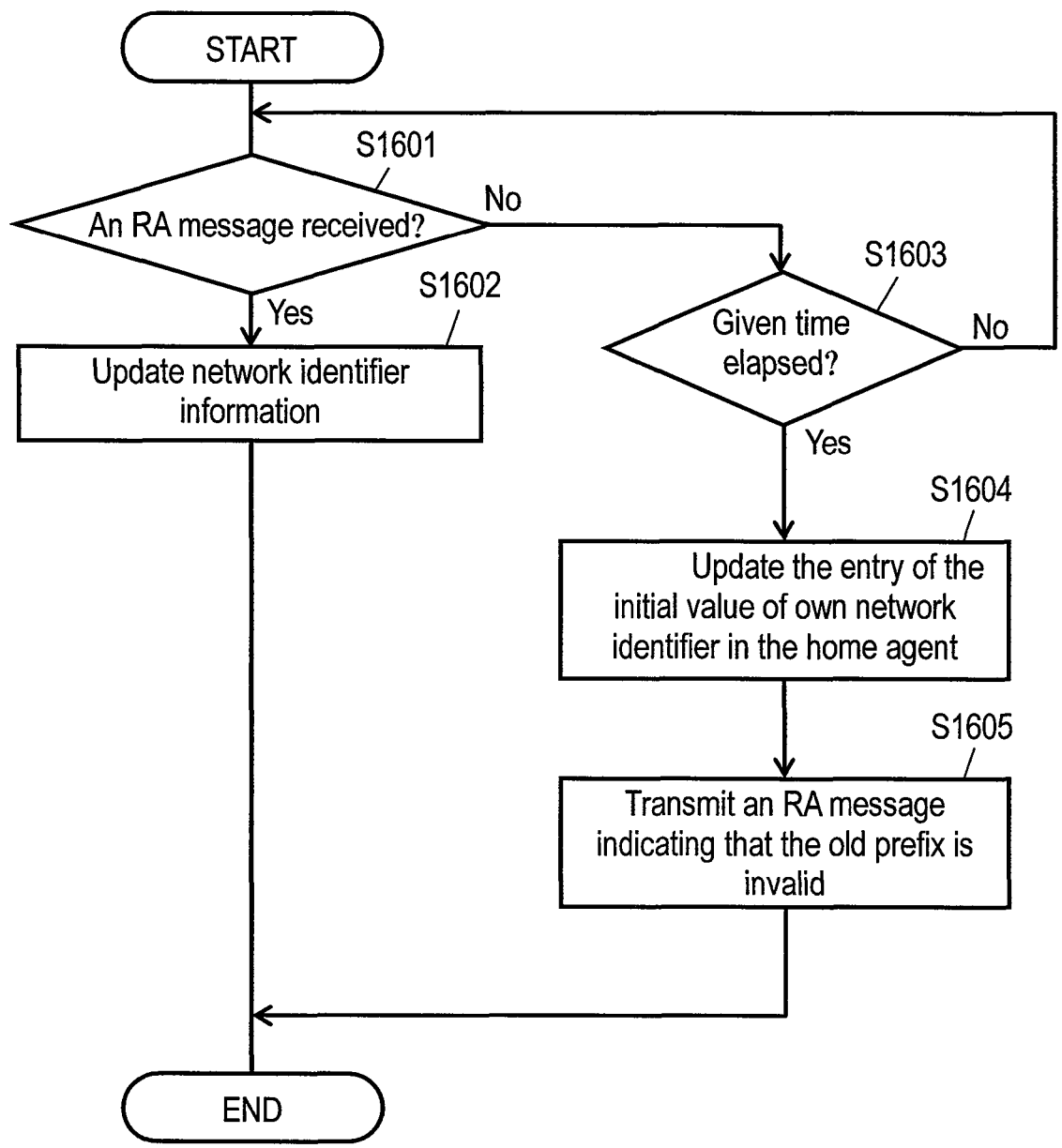
FIG. 16 is a flowchart illustrating a process when a mobile router according to the embodiment of the present invention stops receiving an RA message from a neighbor mobile router.

FIG. 16 is a flowchart illustrating a process in which mobile router 4-2 according to the present invention at this moment resets the entry of position registration in home agent 7.

First, network identifier selecting unit 407 of mobile router 4-2 checks whether or not network identifier advertisement receiving unit 406 has received an RA message from a neighbor mobile router (step S1601). If unit 406 has received, unit 407 updates the network identifier information shown in steps S22 through S26 in FIG. 5 (step S1602).

Meanwhile, if unit 406 has not received an RA message, unit 407 checks whether or not a given time has elapsed since receiving the latest RA message (step S1603). If not having elapsed, unit 407 returns the process flow to step S1601.

Meanwhile, if having elapsed, unit 407 recognizes as being breakaway from mobile network 2 that the self has belonged to, and selects the network identifier initially set to the self as a network identifier of the internal link that the self connects to. Then, unit 407 update the entry of the prefix in home agent 7 in the same way as in steps S24, S25 shown in FIG. 5 (step S1604).

Next, network identifier advertisement transmitting unit 405 multicasts an RA message indicating that the previous prefix is invalid (step S1605).

This embodiment uses prefix option field 135, but not limited. Another extension of an RA message may be used as long as a prefix to be shared, and a network identifier selection index and expiration time for selecting the prefix can be informed.

In this embodiment, the description is made for a case where both mobile routers 4-1, 4-2 are sequentially connected to an access router in a state unregistered in home agent 7, but not limited. The process of sharing a network identifier can be performed as well in a case where another mobile router being accompanied by a terminal connects to a mobile network already registered in a home agent.

As described above, the present invention allows plural mobile routers with different prefixes being set to the internal link at first, to share one network identifier. Consequently, robustness and load distribution are implemented by means of plural mobile routers.

Since each mobile router remains retaining a unique network identifier, a mobile router can configure a mobile network by itself when separating from the mobile network. Herewith, an optimum configuration can be selected according to a state of connection/disconnection and positional relationship between mobile routers. Consequently, interruptions of communication in a mobile network can be reduced.

In this embodiment, the selection index used for selecting a network identifier employs elapsed time since a prefix is registered in a home agent, but not limited. The selection index can employ the number of terminals subordinate to the mobile router or its related information.

Hereinafter, a description is made for a case where the selection index employs information corresponding to the number of terminals.

For example, mobile router 4 can acquire information corresponding to the number of terminals subordinate to the self by using a neighbor cache with the data structure as shown in FIG. 13.

In FIG. 13, IP address 141 records the IP address of the terminal; MAC address 142, the MAC address of the terminal; interface 143, an interface at the link connecting to the terminal, namely internal network interface IF_in here.

When mobile router 4 receives a packet from terminal 5, the entry for terminal 5 is added to a neighbor cache, and thus the actual number of terminals is not necessarily reflected. However, such number is more appropriate as a selection index of a network identifier than the actual number of terminals in the sense that a terminal continuing communication is registered.

Thus, a mobile router could transmit the number of terminals registered in the neighbor cache, set to network identifier selection index 133 in an RA message.

A mobile router records the number of terminals in selection index 93 of network identifier storing unit 409.

This action allows a mobile router to use the number of terminals recorded in a neighbor cache as the selection index.

Here, using the number of terminals as the selection index enables the number of terminals with their addresses generated from a prefix different from the common network identifier, to be smaller than that from the common prefix. Consequently, the number of terminals with their communication being interrupted can be reduced, which further facilitates sharing a prefix.

INDUSTRIAL APPLICABILITY

The present invention is useful for a mobile router in such as a mobile network system including plural PANs (personal area network) mixed and is suitable for sharing a network identifier when these PANs merge.

The invention claimed is:

1. A method of sharing a network identifier for a plurality of mobile routers in a mobile network, comprising:
   a step in which at least two mobile routers initially set a first network identifier unique to an internal link that the at least two mobile routers connect to;
   a step of transmitting a first message for advertising the first network identifier initially set;
   a step of selecting the network identifier from either one of the first network identifier initially set or the advertised network identifier, as a second network identifier of the internal link that the at least two mobile routers connect to, when one mobile router of the at least two mobile routers receives a second message advertising the second network identifier different from the first network identifier initially set, as the new network identifier of the internal link; and
   a step in which the one mobile router, if the selected network identifier is identical to the first network identifier initially set, continues advertising the first network identifier in the mobile network and additionally registers the first network identifier in a home agent, and if the selected network identifier is not identical to the first network identifier, stops transmitting the first message advertising the first network identifier initially set and registers the second network identifier in the home agent as the new network identifier of the internal link,
   wherein each message with which the one mobile router advertises the first or second network identifier to the internal link includes a respective elapsed time that indicates a time since the first or second network identifier was registered in the home agent, and
   wherein a respective mobile router of the plurality of routers that has received the first or second message selects one of the first or second network identifier according to a comparison of the respective elapsed times in the step of selecting the network identifier.

2. The method of sharing a the network identifier of claim 1, wherein the one mobile router preferentially selects the first or second network identifier with a longer elapsed time.

3. The method of sharing the network identifier of claim 1, wherein the first or second message with which the one mobile router advertises the first or second network identifier to the internal link includes a number of terminals subordinate to the one mobile router or information on the number of terminals; and
   wherein the mobile router selects the first or second network identifier according to the number of terminals or the information on the number of the terminals.

4. A mobile router in a mobile network system including a mobile network with at least two mobile routers and at least one terminal interconnected, and a home agent managing a position of the mobile network, comprising:
   a network identifier setting unit that initially sets an initial network identifier unique to an internal link;

a network identifier advertisement receiving unit that receives an advertised network identifier advertised from an other neighbor mobile router;

a network identifier selecting unit that selects either one of the initial network identifier that the network identifier setting unit has initially set and the advertised network identifier that the network identifier advertisement receiving unit has received, as a network identifier of the internal link that the mobile router connects to;

a movement management unit that requests the selected network identifier selected by the network identifier selecting unit along with information on a position of the mobile router to be registered in the home agent; and a network identifier advertisement transmitting unit that, if the selected network identifier selected by the network identifier selecting unit is the initial network identifier, transmits a network identifier advertising message including the selected network identifier, to the internal link, wherein the network identifier advertisement message includes information on an elapsed time since the selected network identifier is registered in the home agent; and wherein the network identifier selecting unit reselects the selected network identifier for the internal link or an other network identifier for the internal link according to a comparison of the information on the elapsed time.

5. The mobile router of claim 4, wherein the network identifier selecting unit preferentially selects a network identifier with a longer elapsed time as the selected network identifier of an internal link according to the information on the elapsed time.

6. The mobile router of claim 4, wherein the network identifier advertisement message includes a number of terminals subordinate to the mobile router as a transmission source of the network identifier advertisement message; and wherein the network identifier selecting unit reselects the network identifier for the internal link or the another identifier for the internal link according to the number of terminals or the information on the number of the terminals.

7. The method of claim 1, advertising, by the one mobile router, one of:

the first network identifier to the internal link in the first message including a first elapsed time that indicates a time since the first network identifier was registered in the home agent, or the second network identifier to the internal link in the second message including a second elapsed time that indicates a time since the second network identifier was registered in the home agent.

* * * * *